United States Patent [19]
Salmi

[11] 3,734,539
[45] May 22, 1973

[54] APPARATUS FOR ALIGNING THE COUPLING ON SEPARATE VEHICLES

[76] Inventor: Melvin I. Salmi, 13619 Pyramid Drive, Dallas, Tex. 75234

[22] Filed: Nov. 3, 1971

[21] Appl. No.: 195,263

[52] U.S. Cl. .................. 280/477, 33/264, 340/282, 340/52 R
[51] Int. Cl. ............................................. B60d 1/14
[58] Field of Search ................ 280/477; 33/264; 340/282, 52 R

[56] References Cited

UNITED STATES PATENTS

| | | | |
|---|---|---|---|
| 2,736,885 | 2/1956 | Thompson | 340/282 |
| 2,797,406 | 6/1957 | Tanis et al. | 340/282 |
| 3,159,917 | 12/1964 | Whitehead | 280/477 X |
| 3,418,628 | 12/1968 | Fenner | 340/52 R |

*Primary Examiner*—Leo Friaglia
*Attorney*—John F. Booth and Kenneth R. Glaser

[57] ABSTRACT

Disclosed is an indicating apparatus for attachment to a trailer or the like for use in aligning the couplings between the trailer and a towing vehicle, said apparatus being mounted on the trailer and having a spring loaded extendible and retractable guide line which releasably attaches to the rear of the towing vehicle adjacent the coupling. Sensing means are included in the apparatus for sensing deflection of the guide line in horizontal and vertical directions and for sensing the separation of the vehicles and indicator means in the vehicle to indicate said deflections and separation to the operator of the towing vehicle. Variable sensitivity means for increasing the sensitivity of the apparatus as the towing vehicle approaches the trailer and means for allowing the towing vehicle to approach the trailer from various angles are also provided.

10 Claims, 9 Drawing Figures

APPARATUS FOR ALIGNING THE COUPLING ON SEPARATE VEHICLES

The present invention relates to an apparatus for aligning, from various approach angles, the couplings between a trailer and a towing vehicle and more particularly to an apparatus which is provided with horizontal, vertical, and relative distance sensors for the two couplings and indicator means for displaying the output of these sensors.

One of the problems that has long faced the owners of recreational trailer vehicles, such as house trailers, boats, and the like, has been the difficulty encountered in hitching a trailer to a towing vehicle, such as a station wagon, truck, or automobile. This difficulty is due to the fact that many of the trailers to which the car must be coupled are large and are so heavy that it is difficult, if not impossible, for a single individual to shift the position of the trailer by hand, therefore, it becomes important for the towing vehicle to be brought into exact position for attachment of couplings of the trailer and towing vehicle. In this regard, it is additionally difficult during the backing to exactly position the coupling of the towing vehicle into proper alignment with the trailer coupling because, in most cases, it is impossible to see the couplings from the driver's position, and therefore, the hitching is accomplished on a hit-or-miss basis or with the guidance of a helper viewing the relative position of the couplings.

Accordingly, it is the general purpose of the present invention to provide an improved alignment apparatus, which is fully automatic, to quickly and simply align the trailer and the towing vehicle from various approach angles without the necessity of additional assistance from a person not located in the towing vehicle. To obtain this, the present invention contemplates the use of a unique arrangement in which a retractable guide line extends between the trailer and the towing vehicle. Sensing means are appropriately positioned so that deflections of the guide line will produce an error signal on an indicator means located in the vehicle in the view of the operator of the vehicle so that correct alignment of the towing vehicle can be accomplished by viewing the error signal.

It is therefore an object of the present invention to provide an improved alignment apparatus for aligning the couplings on a trailer and a towing vehicle.

Another object of the present invention is to provide an improved alignment apparatus which senses and indicates the relative vertical position of the couplings on the trailer and the towing vehicle.

A further object of the present invention is the provision of an improved alignment apparatus which senses and indicates the relative horizontal position of the couplings on the trailer and the towing vehicle.

A further object of the present invention is the provision of an improved alignment apparatus which senses and indicates the relative distance between the couplings on the towing vehicle and the trailer.

Yet another object of the present invention is the provision of an improved alignment apparatus which has a variable sensitivity as the coupling of the towing vehicle and the trailer vary in separation distance.

Another object of the present invention is the provision of an improved alignment apparatus which allows the towing vehicle to approach the trailer from various angles.

Still a further object of the present invention is the provision of an improved alignment apparatus which is simple and inexpensive to manufacture and use.

Other objects and many of the attendant advantages of the present invention may be readily appreciated by those of ordinary skill in the art as the same becomes better understood by reference to the following detailed description when considered in connection with the accompanying drawings, in which:

Figure 1:
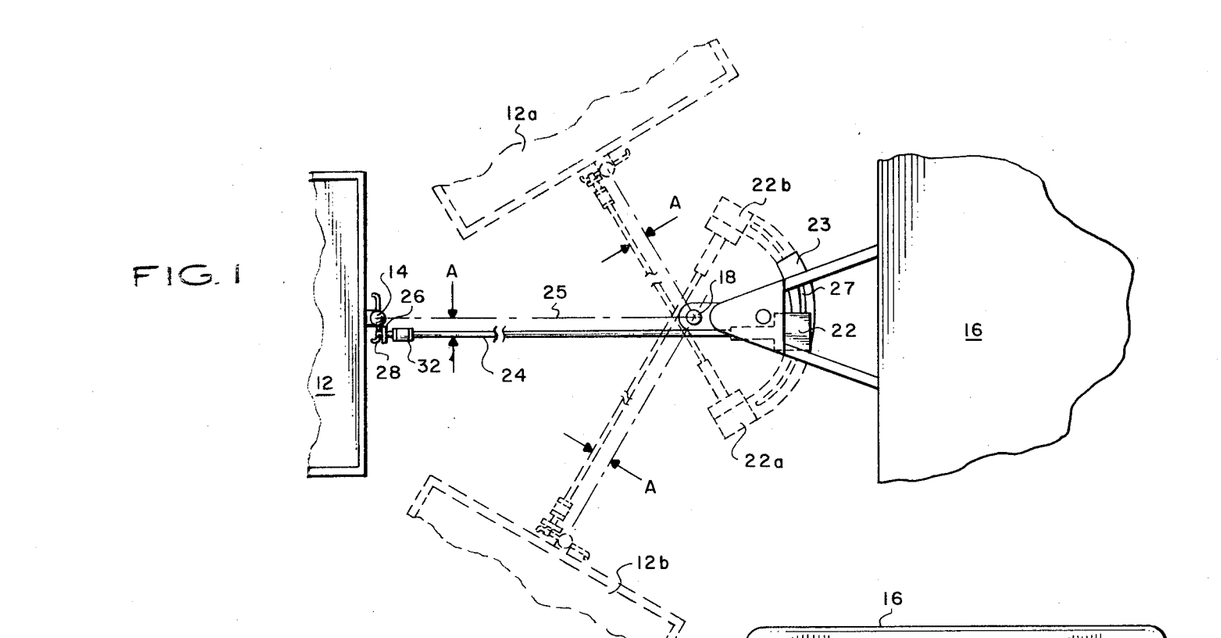
FIG. 1 illustrates a plan view of a towing vehicle and trailer with the improved coupling alignment apparatus of the present invention attached thereto.
Figure 2:
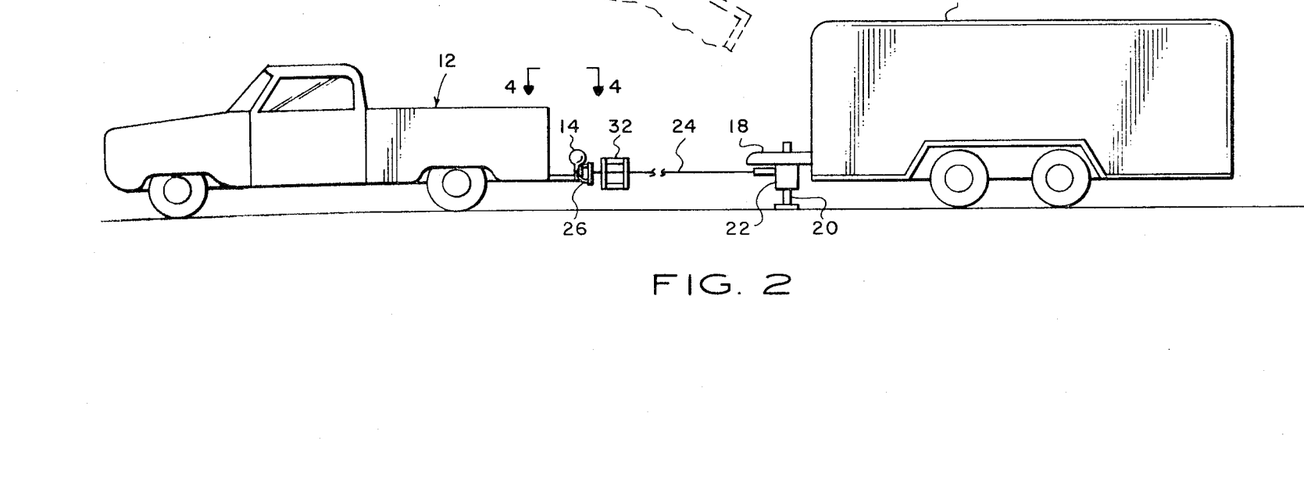
FIG. 2 illustrates an elevational view of a towing vehicle and trailer with the improved coupling alignment apparatus of the present invention attached thereto.

Referring now to the drawings wherein like reference characters designate like or corresponding parts throughout the several views, there is shown in FIGS. 1 and 2, a towing vehicle 12 and trailer 16 shown prior to the towing vehicle being guided up to and attached to the trailer 16. The towing vehicle 12 has a hitch 14 and trailer 16 has hitch assembly 18 which can be attached together when the two hitches are appropriately positioned. The trailer 16 is provided with a conventional jack 20 which is preferably of the auxiliary power type to enable the relative height of the hitch assembly 18 to be remotely adjusted as required during the hitching procedure. As will be subsequently described in more detail, an alignment apparatus 22 is attached to the trailer 16 in the vicinity of the hitch assembly 18. This apparatus 22 is provided with a guide line 24 which is attached to the towing vehicle 12 in the vicinity of the hitch 14 to assist in guiding the approach of the towing vehicle to the trailer 16. The alignment apparatus 22 is electrically connected to an electrical display panel (not shown) located within the towing vehicle 12 within view of the operator to display directional signals to the operator, and to assist the operator in backing the towing vehicle into vertical and horizontal alignment so that hitch 14 and hitch assembly 18 can be aligned and connected without additional assistance and guidance during relative positioning of the two vehicles. The indicator means can be of numerous types, but for purposes of description, a panel having a plurality of identified lights which can be selectively illuminated by use of sensor means to be hereinafter described. As will be explained, the alignment apparatus 22 can be adjusted to allow for the approach of the towing vehicle 12 to the trailer 16 from a variety of angles.

Figure 3:
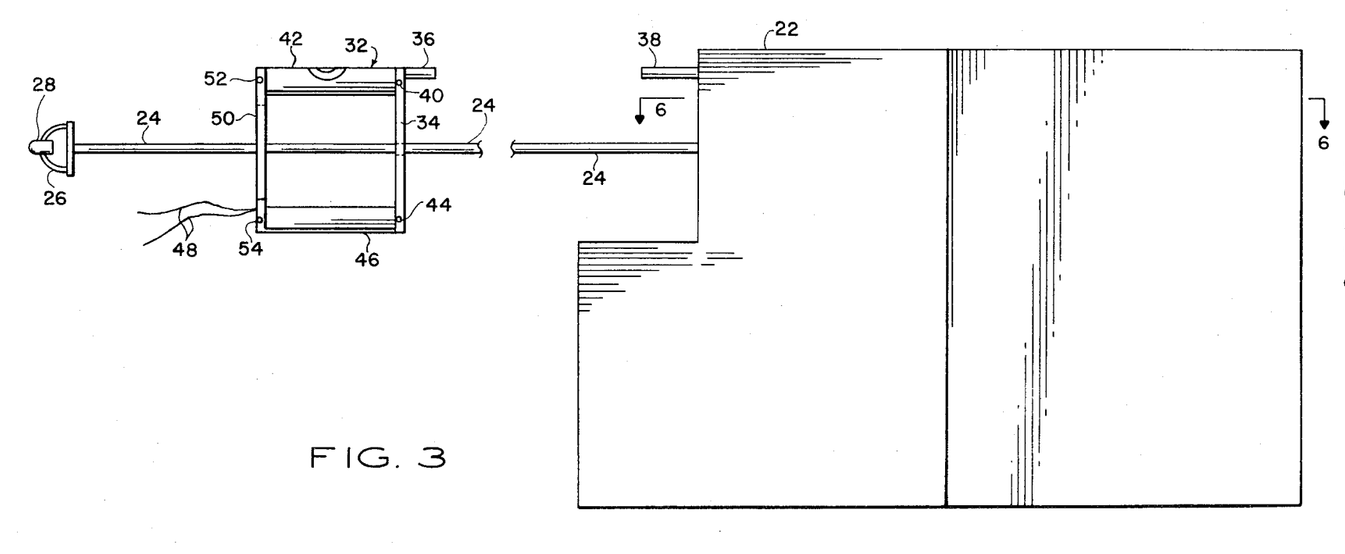
FIG. 3 illustrates an enlarged elevated view similar to FIG. 2.

As is shown in detail in FIG. 3, the alignment apparatus 22 has a guide line 24 which retractably extends therefrom. This guide line 24 is preferably constructed from a multi-element conductor, but could be constructed from standard cable, rope, or the like. The desirability of using a conductor for the guide line 24 can be appreciated when it is considered that the conductor provides convenient means by which the indicator means in the towing vehicle can be electrically connected to the various sensor elements in the alignment apparatus to be hereinafter described. An attachment loop (or hook) 26 is connected to the extending end of the guide line 24 for attaching the guide line 24 to an anchor 28 on the towing vehicle 12.

Figure 4:
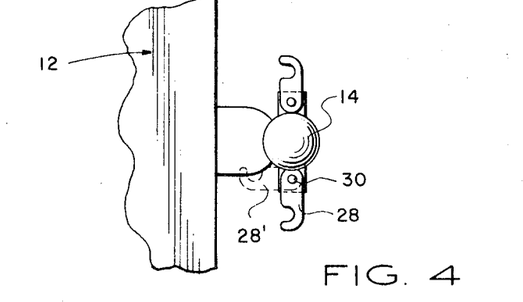
FIG. 4 illustrates an enlarged partial plan view of the towing vehicle coupling with an anchor of the present invention attached thereto looking in the direction of arrows 4—4 of FIG. 2.

As can be seen in FIG. 4, anchor 28 is pivotally attached to the hitch 14 at 30 so that it may pivot between the position shown in solid lines and the position 28' shown in phantom lines. This pivoting allows the anchor 28 to swing back on contact to prevent damage thereto. Also, as shown, an anchor 28 can be attached to either or both sides of the hitch 14 so that the guide line 24 may be attached as desired. Thus, by attaching the loop 26 to the anchor 28, the guide line 24 will extend between the alignment apparatus 22 on the trailer 16 and the towing vehicle 12 as shown in FIGS. 1 and 2.

As is best shown in FIG. 1, the apparatus 22 and anchor 28 are so positioned to one side of the hitches that the guide line when extended between the towing vehicle and the trailer will be parallel to imaginary lines 25 passing through the centers of the hitch 14 and hitch assembly 18. The guide line 24 will be displaced a distance A from the line 25 with the guide line 24 extending in the direction the towing vehicle must travel to correctly align the hitches. As will be described in detail, the apparatus 22 is provided with means to sense deflections of the guide line 24 from the correct angle of approach and will indicate the deflections to the operator of the towing vehicle so that he may make appropriate corrections while backing of the towing vehicle up to the trailer.

In solid lines in FIG. 1, the direct approach for aligning the vehicles and attaching the hitches is shown. In phantom lines other examples of approach directions that can be used by adjusting the position of the alignment apparatus 22 are shown. These other approach directions are accomplished by mounting the alignment apparatus 22 on the towing vehicle 16 so that it can rotate through various angles, yet keep the same parallel spacing A from the line 25. In the illustrated embodiment, the apparatus 22 is mounted on a support 23 which is provided with an arcuate groove 27. The groove 27 is shaped so that guides (not shown) on the trailer 16 will mate with groove 27 and allow the alignment apparatus to move between position 22 shown in solid lines and 22a shown in phantom lines. It is also apparent that the alignment apparatus can be located on the opposite side of the hitch assembly 18 and moved as shown in phantom lines to position 22b.

Figures 5, 7:
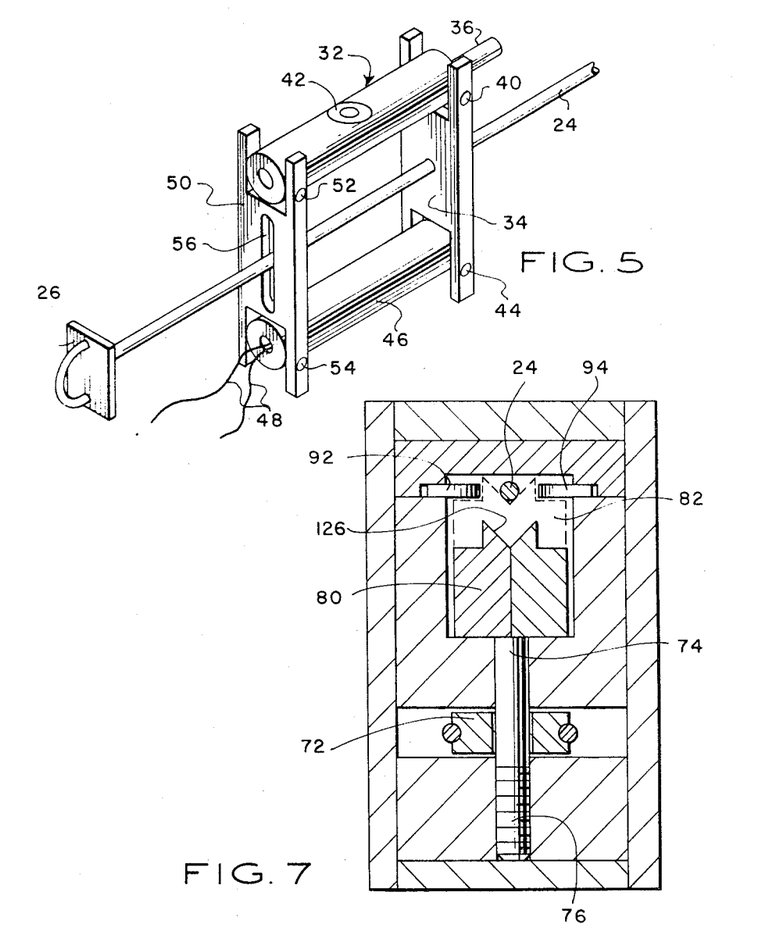
FIG. 5 is a perspective view of the vertical sensor assembly.
FIG. 7 is a sectional view taken on line 7—7 of FIG. 8 looking in the direction of the arrows.

As can be seen in detail in FIGS. 3 and 5, a vertical sensor assembly 32 is supported by guide line 24 adjacent to the loop 26. This vertical sensor assembly 32 is designed to sense the relative position between the hitch 14 and hitch assembly 18 and actuate an indicator means located in the interior of the vehicle 12 or automatically control the height of jack 20 during the hitching operation. This vertical sensor assembly 32 is constructed from a transverse member 34, which is attached to the guide line 24 to extend perpendicularly therefrom. This transverse member 34 is provided with a referencing socket 36 which will removably attach to a mating referencing socket 38 on the alignment apparatus 22. Pivotally attached at 40 to the upper end of the transverse member 34 is a level assembly 42. This level assembly 42 can be of the ordinary carpenter-type level which physically indicates the horizontal inclination of the assembly 42.

Pivotally attached at 44 to the lower end of the transverse member 34 is a mercury switch assembly 46. This mercury switch assembly 46 has electrical conductors 48 extending therefrom, which conductors are selectively connected and disconnected in the mercury switch assembly 46 due to the orientation of the assembly 32. A second transverse member 50 is pivotally connected between the level assembly 42 and mercury switch assembly 46, respectively, at pivots 52 and 54. A groove 56 is provided in the second transverse member 50 to allow the guide lines 24 to extend therethrough without contacting the member 50. The pivots 40, 44, 52, and 54 are each provided with locking apparatus, which are not shown, but are well known in the art, for releasably holding the parallelogram formed by the transverse member 34, level assembly 42, second transverse member 50, and mercury switch assembly 46, in the desired orientation. This locking apparatus could be in the form of a thumb screw or the like which could be rotated to clamp the adjacent members together and prevent relative rotation therebetween.

The desired orientation of the parallelogram is determined initially by engaging the sockets 36 and 38 to hold the transverse member 34 in a position perpendicular to the pitch axis of the tongue of trailer 16 and the ground surface. The locking apparatus is released, and the pivots 40, 44, 52, and 54 allow the parallelogram to be manually adjusted until the bubble of level assembly 42 is centered to indicate that the assembly 32 is in a position with level assembly 42 and mercury switch assembly 46 perpendicular to the force of gravity, whereupon the locking apparatus are again engaged. By adjusting the parallelogram as described above the extension of the guide line 24 will be parallel to the pitch angle of the tongue of the trailer 16 and will tend to guide the approach of the hitch of the towing vehicle 12 along the line 24. Thereafter guide line 24 is extended until the loop 26 is attached to the anchor 28 and the conductors 48 are releasably connected to the indicator means inside the towing vehicle 12. In this manner the relative position of the hitch 18 on the towing vehicle 12 and the hitch 14 on the trailer 16 will be indicated by the output of the mercury switch assembly 46 on the indicator means in the towing vehicle 12 and /or can be connected to the control mechanism of the jack 20 to operate the jack 20, lift or lower the trailer 16 until the mercury switch assembly 46 is level. This automatic leveling can continue during the approach of the towing vehicle 12 to the trailer 16. In this manner, the correct relative position of the hitches 14 and 18 can be maintained.

Figure 6:
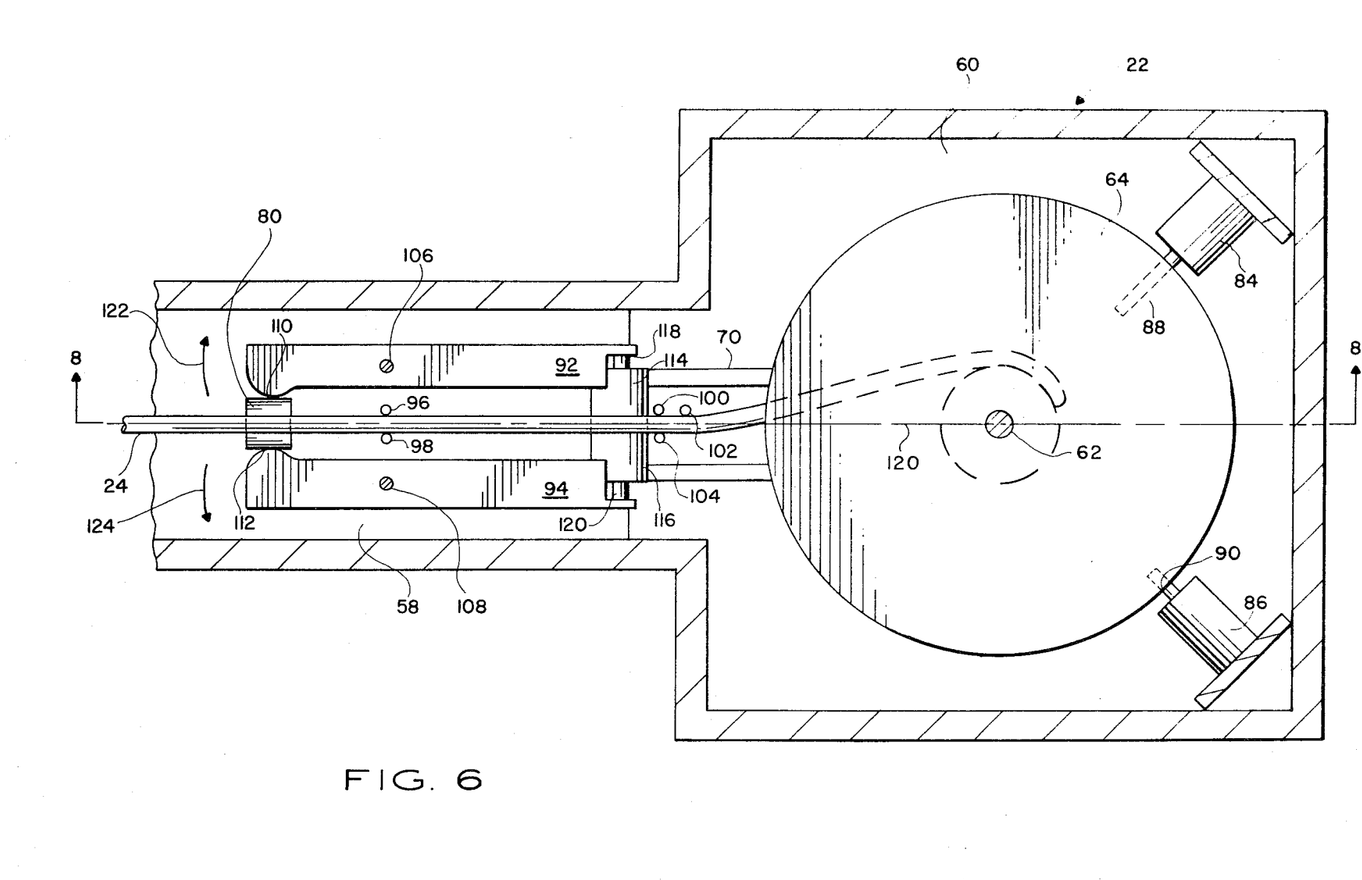
FIG. 6 is a sectional view taken on line 6—6 of FIG. 3 looking in the direction of the arrows.
Figure 8:
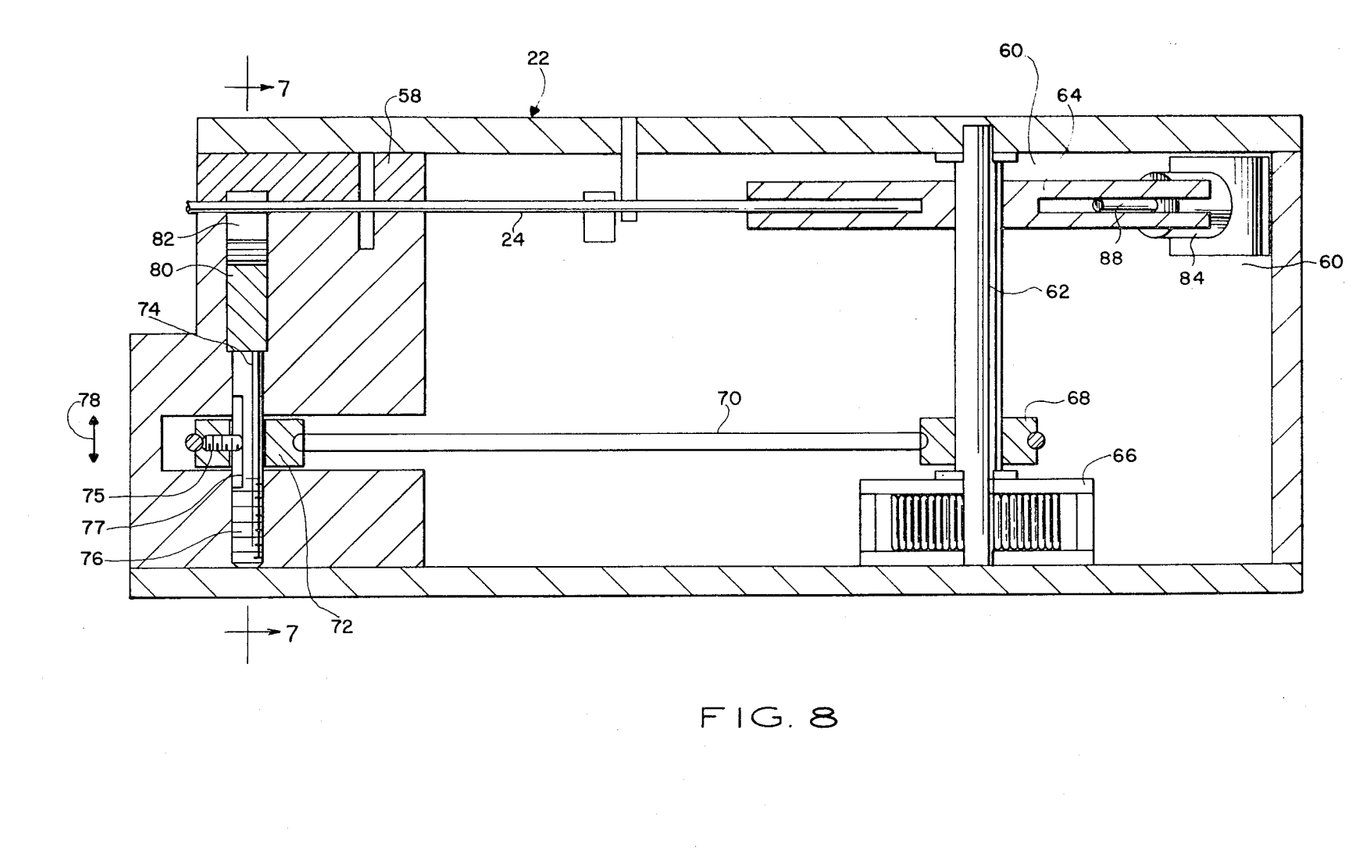
FIG. 8 is a sectional view taken on line 8—8 of FIG. 6 looking in the direction of the arrows and FIG. 9 is a schematic wiring diagram.

Referring now to FIGS. 6, 7, and 8, the details of the construction of the alignment apparatus 22 will be described. In FIGS. 6 and 8, it can be seen that the alignment apparatus 22 is divided into a sensor portion 58 and a guide line storage portion 60. The portion 60 is provided with a shaft 62 which is mounted to rotate about a vertical axis and carries a storage pulley 64 of a sufficient capacity to store the guide line 24 thereon.

Attached to the opposite end of shaft 62 from storage pulley 64 is a torque spring assembly 66 mounted to exert a continuous force on the shaft 62 which tends to rotate the storage pulley 64 in a direction to pull the guide line 24 into the alignment apparatus 22 and wrap it around the pulley 64. It thus can be seen by extending the guide line 24 until the loop 26 is hooked on the anchor 28, that the guide line 24 will be tensioned by the spring assembly 66 and will be reeled onto the storage pulley 64 as the towing vehicle 12 approaches the trailer 16.

A pulley 68 is attached to the shaft 62 between the spring assembly 66 and storage pulley 64 to rotate with the shaft 62. An endless belt 70 is entrained upon the pulley 68 and an additional pulley 72 which is mounted on a vertical shaft 74. This pulley 72 is mounted so that it will axially slide with respect to the shaft 74 and is provided with a set screw 75 which rides in an axial groove 77 in the shaft 74. The shaft 74 is mounted to rotate about a vertical axis in the sensor portion 58 of the alignment apparatus 22 with the lower end of the shaft 74 in threaded engagement with the threads 76 in the body of the apparatus 22, so that when the shaft 74 is rotated, it will be axially translated in the direction of arrow 78 due to the engagement of the threads 76. A sensitivity member 80 is slidably mounted in a vertically extending groove 82. The purpose and operation of the sensitivity member 80 will be explained hereinafter, it only being important to note that the sensitivity member 80 will be moved in a direction of arrow 78 as the shaft 74 is rotated.

A pair of limit switches 84 and 86 are illustrated in FIG. 6, mounted with their sensor members 88 and 90, respectively, extending into the storage pulley 64. Sensor 88 extends further radially into the pulley 64 than does the sensor 90. The limit switches 84 and 86 are each electrically connected to the indicator means so that when the cable stored on the pulley 64 extends a sufficient distance radially to contact either of the sensors 88 or 90, the indicator means will be actuated to indicate this condition to the operator of the towing vehicle. The purpose of these switches 84 and 86 is to sense the relative separation of the trailer and the towing vehicle by sensing the amount of guide line 24 stored on the pulley 64, and to indicate this relative separation to the operator by means of the indicator means. In operation the sensors are so positioned that when the guide line 24 stored on the pulley contacts the sensor 88, it in turn actuates a caution signal on the indicator means to inform the operator that the hitches are nearing each other. The sensor 90 is so positioned to cause a stop signal on the indicator means to inform the operator that the two hitches are in vertical alignment for coupling. These switches 84 and 86 and the other switches, within the apparatus 22, can be connected to the conductors in line 24 through suitable brushes or the like (not shown) on the shaft 62.

Mounted in the sensor portion 58 is a pair of sensor fingers 92 and 94 for sensing the horizontal deflection of the guide line 24. As can be seen in FIG. 6, the guide line 24 is positioned between the two sensing fingers 92 and 94 and is held in position therebetween by pins 96, 98, 100, 102, and 104. The sensor fingers 92 and 94 are each mounted to rotate about vertically extending shafts 106 and 108, respectively, and are provided with guide line engaging portions 110 and 112, respectively.

A pair of limit switches 114 and 116, are mounted with their sensors 118 and 120, respectively, contacting a portion of the fingers 92 and 94, respectively. By mounting the switches in this manner, switch 114 will be operated by the rotation or movement of finger 92 about shaft 106 and switch 116 will be operated by the rotation or movement of finger 94 about shaft 108. These switches 114 and 116 are electrically connected to the indicator means so that when the finger 92 is caused to rotate about shaft 106 in the direction of arrow 122, switch 114 will be closed to energize the indicator means and inform the operator that the trailer and towing vehicle are out of alignment. Likewise, rotation of finger 94 about shaft 108 in the direction of arrow 124 will close switch 116 and energize the indicator means.

Thus, it can be seen that sufficient deflections of the guide line 24 will cause contact between the guide line 24 and one of the fingers, thus operating either switch 114 or 116. By observing the display means during backing of the towing vehicle 12, the operator can determined the correct angle of approach and guide the vehicle therealong.

As is best illustrated in FIGS. 7 and 8, the sensitivity member 80 is shown slidably mounted in a groove 82 and is vertically positioned in said groove by a separate shaft 74. The sensitivity member 80 is of a smaller width than the groove 82 and is mounted so that it may slide back and forth in a horizontal direction, as seen in FIG. 7, across the width of the groove 82. As was pointed out previously, the rotation of the shaft 62 causes a rotation of the shaft 74 which in turn causes the shaft 74 to move in an axially upward direction as the guide line 24 is reeled onto the storage reel 64 by the torque spring assembly 66. The relative geometrical size of the sensitivity member 80 and the shaft 74 is arranged so that as the hitch 14 on the towing vehicle 12 approaches the hitch assembly 18 on the trailer 16, the sensitivity member 80 will be moved in an upward direction into the path of the deflection of the guide line 24. The upper end of the sensitivity member 80 is provided with a V-shaped groove 126 which slides up between the sensor fingers 92 and 94 as the sensitivity member 80 is moved in an upward direction. It thus can be seen, the further the sensitivity member 80 is moved in the upward direction the narrower is the effective spacing between the two sensor fingers 92 and 94, thus increasing the sensitivity of the device in that contact of the guide line 24 on the surfaces of the V-shaped groove 26 will in turn cause the engagement of member 80 with the sensor fingers 92 or 94.

Figure 9:
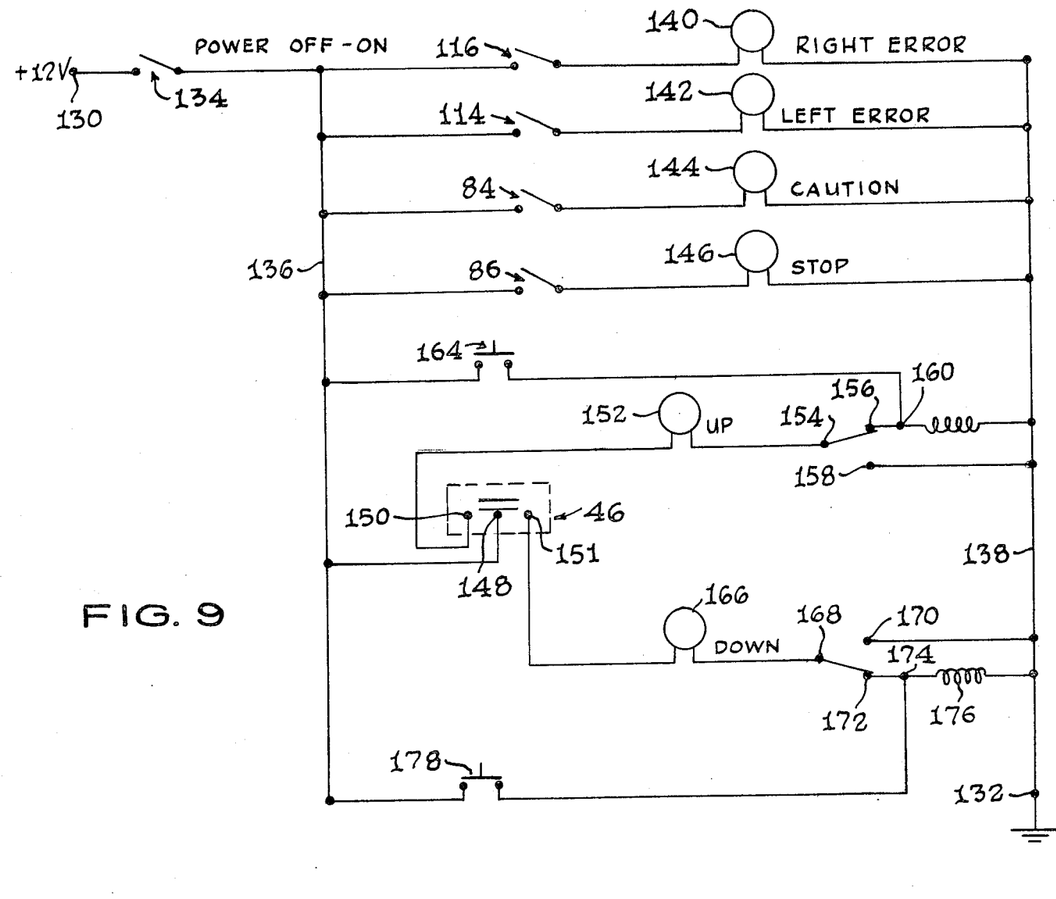

A schematic wiring diagram showing connection of the various switches is shown in FIG. 9. Point 130 is a terminal point to which +12 volt power can be supplied while terminal point 132 is connected to ground. This power can be obtained from the power system of either the towing vehicle 12, trailer 16 or a separate battery can be provided as desired.

The terminal 130 can be connected through an off-on power switch 134 to a positive bus 136. Terminal 132 is in turn connected to bus 138. This switch 134 can be mounted in the towing vehicle and is used to supply power to the system.

The previously described switch 116 is connected in series with indicator light 140 between bus 136 and bus 138. This indicator light 140 is located in the towing vehicle on the previously mentioned control panel and will be energized when switch 116 is closed.

In a similar manner indicator lights 142, 144 and 146 are connected in series with previously described switches 114, 84 and 86, respectively. Each of these indicator lights are located on the control panel and are energized when their respective switch is closed.

As the switches 116 and 114 are selectively closed as previously described, indicator lights 140 and 142 will indicate respectively right and left deflection of the towing vehicle from the desired line of approach. As switches 84 and 86 are selectively closed as previously described indicator lights 144 and 146 will indicate the relative separation of the towing vehicle and the trailer.

Mercury switch 46 has its center contact 148 connected to bus 136. This switch has contacts 150 and 151, each of which can be selectively connected to contact 148. Indicator light 152 is connected between contact 150 and center terminal 154 of a single pole double throw switch. This switch can selectively engage either contact 156 or 158. Contact 158 is connected to bus 138 while contact 156 is connected to terminal point 160. A relay coil 162 is connected between point 160 and bus 138. A normally opened switch 164 is connected between point 160 and bus 136. The relay coil 162 closes normally closed contacts (not shown) which electrically energize a motor to cause the trailer jack 20 to elevate the trailer hitch 14. The mercury switch 46 is oriented as previously described so that when the trailer hitch 14 is low, contacts 148 and 150 will be connected thus energizing indicator light 152 and if switch terminal 154 is connected to contact 156, relay coil 162 will be energized. If the switch terminal 154 is connected to contact 158, the coil 162 will not be energized. In addition, when switch 164 is closed relay coil 162 can be manually energized.

In a similar manner contact 151 is connected to a down indicator light 166 which is in turn connected to terminal 168 of a single pole double throw switch. Contact 170 is connected to bus 138 while contact 172 is connected to terminal point 174. Relay coil 176 is connected between point 174 and bus 138. A normally open push button switch 178 is connected between bus 136 and point 174. Thus it can be seen that when the trailer hitch 14 is high, contacts 148 and 151 will be connected, energizing indicator light 166 and if switch terminal 168 is connected to contact 172, relay coil 176 will be energized. This relay coil 176 when energized will close normally opened contacts (not shown) to supply power to the motor of jack 20, to in turn lower the hitch 18. If it is desired to manually lower the hitch 18, switch 178 can be closed to energize coil 176.

It should be understood, of course, that the foregoing disclosure relates to only a preferred embodiment of the invention in that numerous modifications or alterations may be made by those of ordinary skill in the art without departing from the spirit and scope of the invention as set forth in the appended claims.

What is claimed and desired to be secured by United States Letters Patent is:

1. An apparatus for guiding the approach of a towing vehicle to align the hitch on the towing vehicle with the hitch on a trailer comprising:
   a. a guide line detachably connected between said trailer and said towing vehicle;
   b. means for maintaining a tension in said guide line as said towing vehicle is moved with respect to said trailer;
   c. sensing means operatively associated with said guide line for sensing the relative vertical and horizontal positions of the hitches on said towing vehicle and said trailer, during the approach of said towing vehicle to said trailer; and
   d. indication means operatively connected to said sensing means for indicating the relative vertical and horizontal positions of the hitches on said trailer and said towing vehicle.

2. An apparatus as defined in claim 1 wherein additional means are provided for sensing and indicating the relative separation of said towing vehicle and said trailer.

3. An apparatus as defined in claim 1, additionally comprising automatic jack means on said trailer for variably adjusting the height of said hitch on said trailer, and control means operatively associated with said sensing means and said jack means for automatically maintaining a fixed, relative vertical separation between said hitch on said towing vehicle and said hitch and said trailer during the approach of said towing vehicle to said trailer.

4. An apparatus as defined in claim 1 wherein, said sensing means additionally comprises variable sensitivity means for increasing the sensitivity of said sensing means to sense the relative horizontal positions of said trailer and said towing vehicle as said towing vehicle approaches said trailer.

5. An apparatus as defined in claim 1 wherein said sensing means additionally comprises adjustment means for guiding the approach of said towing vehicle to said trailer from various directions of approach.

6. An apparatus for guiding the approach of a towing vehicle to align the hitch on the towing vehicle with the hitch on a trailer comprising:
   a. a guide line detachably connected between said trailer and said towing vehicle;
   b. sensing means operatively associated with said guide line for sensing the relative vertical and horizontal positions of the hitches on said towing vehicle and said trailer, during the approach of said towing vehicle to said trailer; and
   c. indication means operatively connected to said sensing means for indicating the relative vertical and horizontal positions of the hitches on said trailer and said towing vehicle.

7. An apparatus as defined in claim 6 wherein additional means are provided for sensing and indicating the relative separation of said towing vehicle and said trailer.

8. An apparatus as defined in claim 6, additionally comprising automatic jack means on said trailer for variably adjusting the height of said hitch on said trailer, and control means operatively associated with said sensing means and said jack means for automatically maintaining a fixed, relative vertical separation between said hitch on said towing vehicle and said hitch and said trailer during the approach of said towing vehicle to said trailer.

9. An apparatus as defined in claim 6 wherein, said sensing means additionally comprises variable sensitivity means for increasing the sensitivity of said sensing means to sense the relative horizontal positions of said trailer and said towing vehicle as said towing vehicle approaches said trailer.

10. An apparatus as defined in claim 6 wherein said sensing means additionally comprises adjustment means for guiding the approach of said towing vehicle to said trailer from various directions of approach.

* * * * *